US008069546B1

(12) United States Patent
Whittemore

(10) Patent No.: US 8,069,546 B1
(45) Date of Patent: Dec. 6, 2011

(54) PLASTIC SHEET CUTTER AND METHOD FOR INSTALLING A ZIPPER ON A SHEET OF MATERIAL

(75) Inventor: Jeffrey P. Whittemore, Arlington, MA (US)

(73) Assignee: Zipwall, LLC., Arlington, MA (US)

( * ) Notice: Subject to any disclaimer, the term of this patent is extended or adjusted under 35 U.S.C. 154(b) by 0 days.

(21) Appl. No.: 12/782,231

(22) Filed: May 18, 2010

Related U.S. Application Data

(62) Division of application No. 11/268,020, filed on Nov. 7, 2005, now Pat. No. 7,743,512.

(60) Provisional application No. 60/625,988, filed on Nov. 8, 2004.

(51) Int. Cl.
*B29D 5/00* (2006.01)
*B21F 45/18* (2006.01)

(52) U.S. Cl. ............................... 29/408; 29/766; 29/410

(58) Field of Classification Search .................... 29/408, 29/766, 409, 410, 770; 30/2, 280, 282, 283, 30/287, 289, 290, 291, 294, 299, 304, 314, 30/286, 359, 279.2
See application file for complete search history.

(56) References Cited

U.S. PATENT DOCUMENTS

| | | | |
|---|---|---|---|
| 707,091 | A | 8/1902 | Dutton |
| 735,309 | A | 8/1903 | Spurlock |
| 2,158,078 | A | 5/1939 | Miller |
| 2,464,206 | A | 3/1949 | Becker |
| D205,286 | S | 7/1966 | Dyment et al. |
| 3,470,923 | A | 10/1969 | Besthorne |
| 3,812,573 | A | 5/1974 | Fukuroi |
| 3,972,117 | A | 8/1976 | Fogg |
| 4,035,913 | A | 7/1977 | Madl et al. |
| 4,064,626 | A | 12/1977 | Meshulam et al. |
| 4,134,206 | A | 1/1979 | Beermann |
| 4,224,730 | A | 9/1980 | Kanzanka |

(Continued)

FOREIGN PATENT DOCUMENTS

| | | |
|---|---|---|
| EP | 0728665 | 8/1996 |

(Continued)

OTHER PUBLICATIONS

"Plastic Sheet Cutter and Method for Installing a Zipper on a Sheet of Material" Specification, Drawings, and Prosecution History of U.S. Appl. No. 11/268,020, filed Nov. 7, 2005, which is stored in the United States Patent and Trademark Office (USPTO).

*Primary Examiner* — Essama Omgba
(74) *Attorney, Agent, or Firm* — Onello & Mello, LLP

(57) ABSTRACT

A cutter operative to pierce and cut a sheet of material includes a handle and a body portion coupled to the handle. The body portion includes two puncture fingers having tips for piercing the sheet of material and two blades for cutting two parallel cuts in the sheet of material. In a method of installing a zipper on a sheet of material, left and right portions of a zipper are applied to a sheet of material. A swath portion of the sheet of material is cut having two parallel, spaced-apart cuts between the left and right portions of the zipper. In this manner, zipper installation is established in a manner that avoids formation of flap of material that would otherwise remain between the left and right flanges of the zipper.

7 Claims, 12 Drawing Sheets

U.S. PATENT DOCUMENTS

| | | | | |
|---|---|---|---|---|
| 4,286,384 | A | 9/1981 | Kotchy | |
| 4,472,879 | A | 9/1984 | Sizemore, Jr. | |
| 4,573,383 | A | 3/1986 | Matsumoto | |
| 4,589,182 | A | 5/1986 | Imai | |
| 4,833,956 | A | 5/1989 | Roberts | |
| 5,067,207 | A | 11/1991 | Semons | |
| 5,103,540 | A | 4/1992 | Hirasawa | |
| 5,311,648 | A | 5/1994 | Semons | |
| 5,335,404 | A | 8/1994 | Ozaki et al. | |
| D352,440 | S | 11/1994 | Perigny | |
| 5,768,787 | A | 6/1998 | Ireland | |
| 5,819,474 | A | 10/1998 | Strom | |
| 5,852,874 | A | 12/1998 | Walker | |
| 5,924,469 | A | 7/1999 | Whittemore | |
| 6,308,422 | B1 | 10/2001 | MacDonald | |
| 6,427,569 | B2 | 8/2002 | MacDonald | |
| 6,513,249 | B2 | 2/2003 | Linton et al. | |
| 7,073,758 | B2 | 7/2006 | Whittemore et al. | |
| 7,509,742 | B2 | 3/2009 | Votolato | |
| 7,533,595 | B2 | 5/2009 | Domenico | |
| 7,533,712 | B2 | 5/2009 | Whittemore et al. | |
| 7,743,512 | B1 * | 6/2010 | Whittemore | 30/304 |
| 2004/0031892 | A1 | 2/2004 | Whittemore et al. | |
| 2004/0065799 | A1 | 4/2004 | Whittemore et al. | |
| 2005/0247414 | A1 | 11/2005 | Whittemore | |

FOREIGN PATENT DOCUMENTS

| | | |
|---|---|---|
| EP | 1459986 | 9/2004 |

* cited by examiner

PLASTIC SHEET CUTTER AND METHOD FOR INSTALLING A ZIPPER ON A SHEET OF MATERIAL

RELATED APPLICATIONS

This application is a divisional application of U.S. patent application Ser. No. 11/268,020, filed on Nov. 7, 2005, now U.S. Pat. No. 7,743,512, which claims the benefit of U.S. Provisional Application No. 60/625,988, filed Nov. 8, 2004, the contents of each being incorporated herein by reference in their entity.

BACKGROUND OF THE INVENTION

In the installation of temporary dust partitions, for example of the type disclosed in U.S. Pat. No. 5,924,469, U.S. Ser. No. 10/600,939, filed Jun. 20, 2003, U.S. Ser. No. 10/600,300, filed Jun. 20, 2003, and U.S. Ser. No. 11/125,583, filed May 10, 2005 the contents of each being incorporated herein by reference, a plastic sheet of material, or other type of material sheeting, is installed between a ceiling and a floor of a room to isolate or seal portions of a room from airborne dust or fumes.

In such partition installations, especially in longer-term installations, it has become popular to apply a zippered opening in the plastic sheeting, to allow for rapid entry and exit to and from the partitioned area. Examples of zippers of this type are disclosed in U.S. Pat. Nos. 5,819,474, 5,067,207 and 5,311,648, the contents of each being incorporated herein by reference. Such zippers commonly include left and right teeth portions, that are respectively bound to left and right flanges. The left and right teeth portions are opened and closed using a zipper pull. The left and right flanges in turn have an adhesive backing that is applied to the installed plastic sheeting.

During installation of a zipper opening of this type, the adhesive backing of the zipper is applied to the plastic sheeting at the location where the zipper is to be installed. The zipper pull is then engaged to open the left and right zipper teeth on the zipper. This exposes the underlying plastic which is still taut and uniform under the zipper. A knife, such as a box cutter, is used to pierce and cut the plastic that is framed by the left and right flanges of the zipper. The plastic is cut for the entire length of the zipper, leaving behind an opening that can be used as an entryway for the installation. The entryway can be opened and closed at will by engaging and releasing the zipper.

When the plastic sheeting underlying the zipper teeth is cut in this manner, a flap of plastic material remains on either, or both, sides of the opening. The flap is usually non-uniform in width, as the knife, when cutting, can waver between the left and right sides of the opening, leaving a unsightly seam. In addition, the flap can interfere with the operation of the zipper, as it can become lodged, or otherwise snag, in the teeth of the zipper during closure. A box cutter also has an exposed razor blade that can be dangerous to operate.

SUMMARY OF THE INVENTION

The present invention is directed to a knife, or cutter, that is operative to pierce and cut a sheet of material, such as plastic material. The present invention is particularly applicable to cutting plastic sheeting of a temporary dust partition to which a zippered opening has been applied. In this manner, zipper installation can be established in a manner that alleviates the problems associated with the non-uniform plastic flap that would otherwise remain between the left and right flanges of the zipper.

In particular, an embodiment of the present invention includes two cutting blades that are positioned in parallel on left and right portions of the cutter. In this manner, when force is applied to the handle, two parallel cuts are made in the plastic, side-by-side, in order to cut a swath of plastic material of a width that is determined by the distance between the blades. Accordingly, the cutter of the present invention is especially amenable to use during zipper installation as described above, for removing a large portion of the material sheeting between the flanges of the installed zipper, thus providing a clean, uniform cut, and reducing the possibility of a remaining flap interfering with the operation of the zipper.

In one aspect, the present invention is directed to a cutter that is operative to pierce and cut a sheet of material. The cutter includes a handle and first and second puncture fingers that extend from the handle. The puncture fingers have piercing ends that are constructed and arranged to pierce a sheet of material to be cut at first and second piercing locations. The cutter further includes first and second blades between the piercing ends of the puncture fingers and the handle. The first and second blades are constructed and arranged to cut the sheet of material starting at the first and second piercing locations and extending in a direction of applied cutting force for cutting two parallel incisions in the sheet of material.

In one embodiment of the present invention, the first and second puncture fingers are oriented to define a cutting region between the first and second puncture fingers and the handle, and the first and second blades are recessed in the cutting region.

In another embodiment of the present invention, the first and second puncture fingers include angled guide surfaces that guide a sheet of material to be cut toward the cutting region.

In another embodiment of the present invention, the cutter further includes a deflector that functions to guide the sheet of material to be cut into the first and second blades of the cutting region.

In another embodiment of the present invention, the deflector is oriented at a second angle that is opposite a first angle of the angled guide surfaces of the first and second puncture fingers, relative to an axis of a direction of cutting.

In another embodiment of the present invention, the cutter includes first and second body sections between the handle and the respective first and second puncture fingers. Each of the first and second body sections includes a corresponding one of the first and second blades.

In another embodiment of the present invention, the cutter further comprises a deflector provided between the first and second blades for guiding the sheet of material into the first and second blades during a cutting operation.

In another embodiment of the present invention, the piercing ends of the first and second puncture fingers are sharp tips.

In another embodiment of the present invention, the handle and the first and second puncture fingers are unitary.

In another embodiment of the present invention, the first and second blades are molded into the handle and the first and second puncture fingers.

In another embodiment of the present invention, the first and second blades are comprised of at least one of sharpened stainless steel, metal or metal alloy.

In another embodiment of the present invention, the first and second blades are spaced apart by a predetermined distance. In one embodiment the predetermined distance is between approximately 0.5 cm and 3.0 cm.

In another embodiment of the present invention, the cutter is at least one of molded from a die, machined from a common stock, or machined or molded as separate parts and assembled.

In another embodiment of the present invention, the handle and the first and second puncture fingers are formed of at least one of plastic, graphite, wood, metal, metal alloy and stainless.

In another aspect, the present invention is directed to a method of installing a zipper on a sheet of material includes applying left and right portions of a zipper to a sheet of material, and cutting a swath portion of the sheet of material having two parallel, spaced-apart cuts between the left and right portions of the zipper.

In one embodiment of the present invention, the method of applying left and right portions of a zipper to a sheet of material includes adhering back portions of the left and right portions to a common surface of the sheet of material.

In another embodiment of the present invention, a central region of the zipper between the left and right portions is not adhered to the sheet of material, and the swath portion of the sheet of material that is cut corresponds to the central region of the zipper.

In another embodiment of the present invention, the method includes, prior to cutting the swath portion, opening the zipper to expose a portion of the sheet of material between the left and right portions.

In another embodiment of the present invention, cutting a swath portion includes cutting through the opened zipper.

In another embodiment of the present invention, cutting a swath portion comprises cutting using a cutter having two spaced-apart blades.

In another embodiment of the present invention, the cutter further includes two piercing fingers corresponding to the two spaced-apart blades and the method further includes first piercing the sheet of material with the piercing fingers in advance of cutting the swath portion.

In another embodiment of the present invention, the cutter further includes a deflector and the method further includes guiding the sheet of material to be cut into the two spaced-apart blades with the deflector.

In another embodiment of the present invention, the sheet of material is a plastic sheet.

In another embodiment of the present invention, the method further includes cutting the two parallel, spaced-apart cuts to a predetermined distance between approximately 0.5 cm and 3.0 cm.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1A:
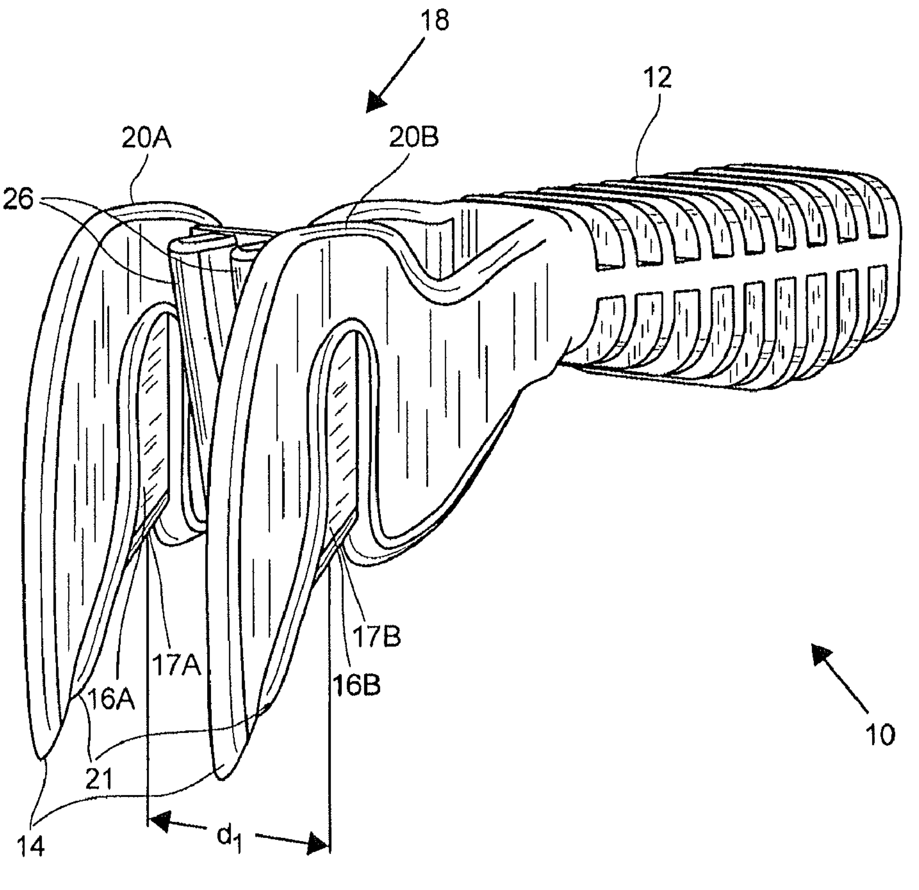
FIGS. 1A, 1B, and 1C are first, second and third perspective views of a cutter in accordance with the present invention.
Figure 1B:
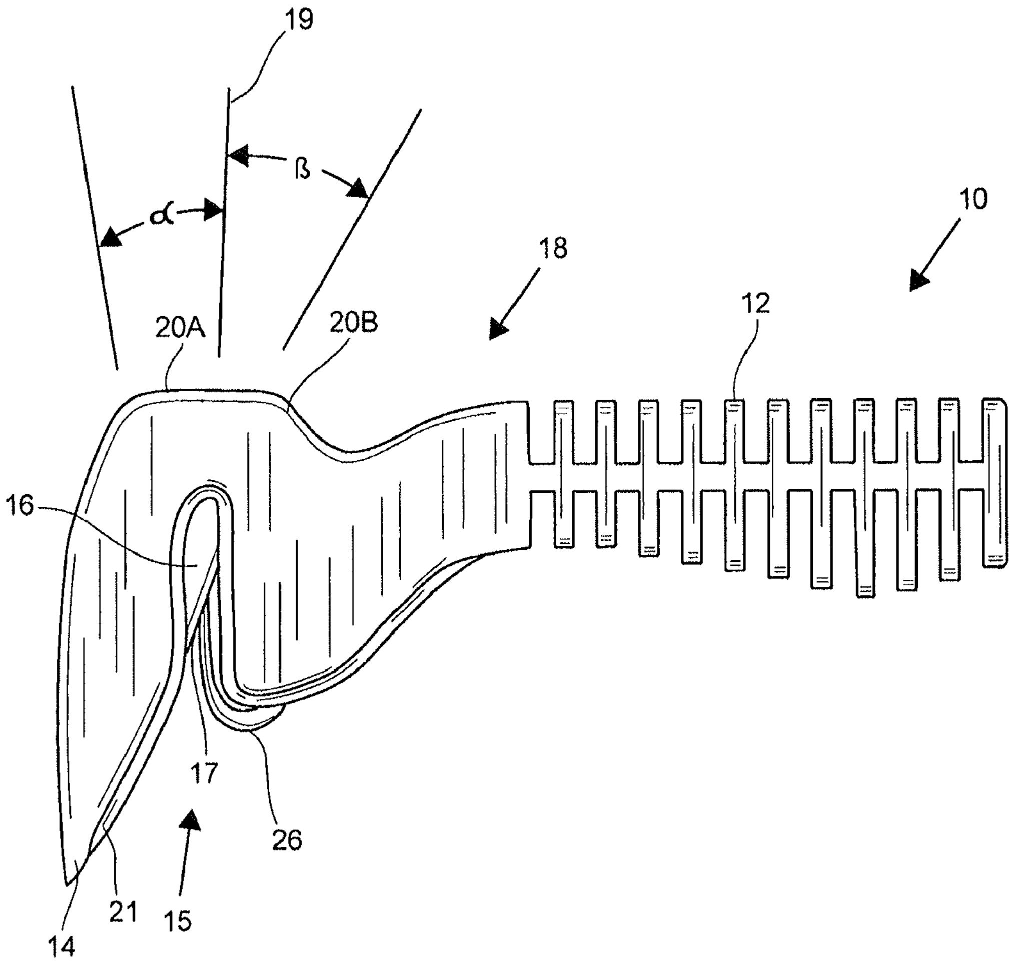
Figure 1C:
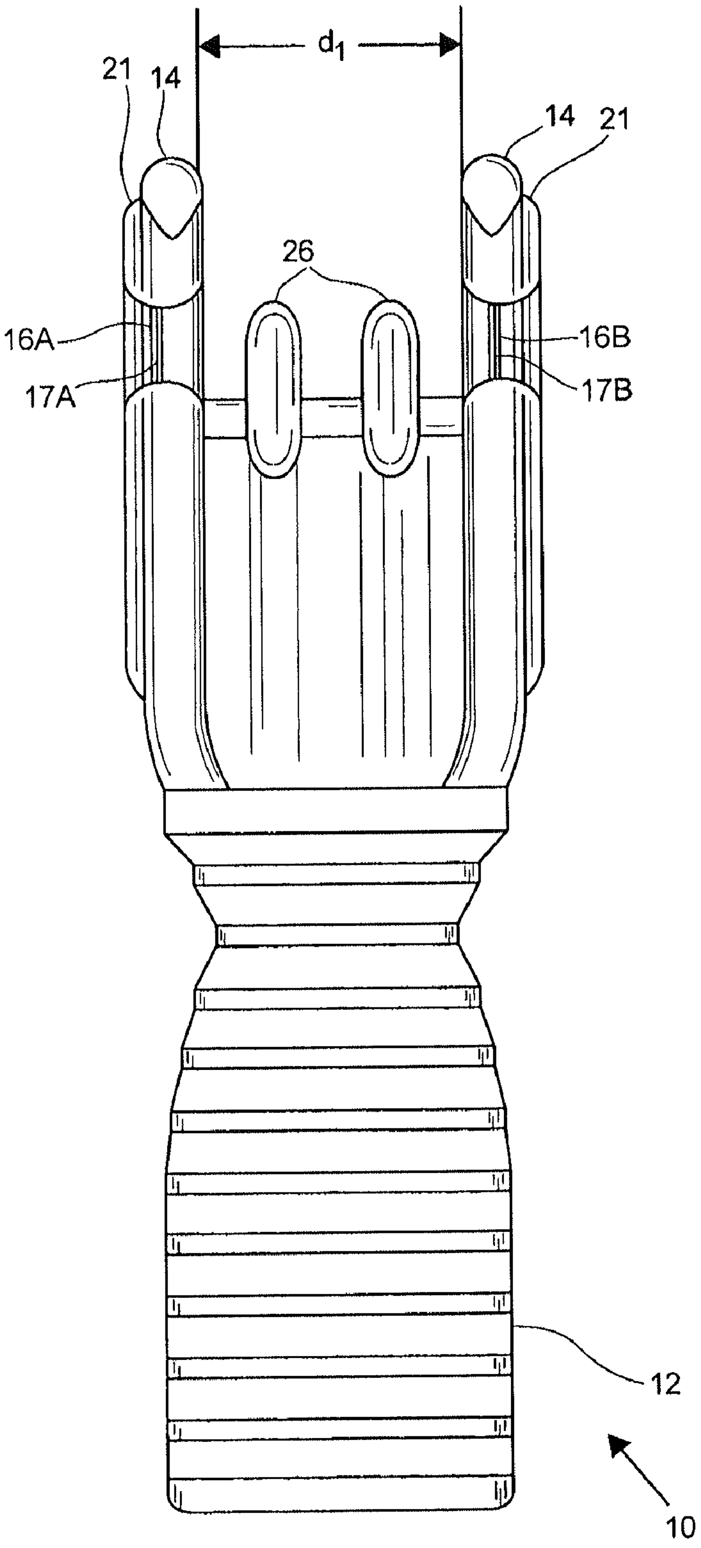

FIGS. 1A, 1B, and 1C are first, second and third perspective views of a cutter in accordance with the present invention.

A cutter 10 includes a handle 12 that is ribbed to provide a gripping surface, to cut down on weight, and to provide for lateral rigidity of the unit.

The handle 12 is coupled to a body portion 18 that is partitioned into left and right spaced-apart body sections 20A, 20B. The left and right body sections 20A, 20B each include a blade 16A, 16B that has an exposed edge 17A, 17B as shown. The sharpness of the blade edges 17A, 17B are appropriate for readily slicing through a sheet of material to be cut, such as plastic sheeting. In one example, the dual blades 16A, 16B comprise sharpened stainless steel, metal, or metal alloy. The exposed blade edges 17A, 17B are preferably oriented to be aligned with the direction of force that is applied to the cutter 10 when cutting the sheet of material. The dual blades 16A, 16B are spaced apart a distance $d_1$, for example in the range of approximately 0.5 cm-3.0 cm, that is consistent with a desired width of the resulting opening in the sheet of material. For example, the distance $d_3$ can be determined in accordance with the dimensions of the zipper that is to be installed, such as the distance between the backing flanges of the zipper, in order to remove a large swath of material between the flanges, and to avoid formation of a flap of material that would otherwise interfere with zipper operation. The dual blades 16A, 16B are preferably recessed in the body 18 of the cutter 10 as shown, allowing for safe operation and safe storage. In one embodiment, the blade edges 17A, 17B are oriented at an angle relative to the direction of cutting, to provide for more enhanced cutting action.

Extending from each of the left and right body sections 20A, 20B opposite the handle 12 are elongated puncture fingers 14 that have sharp tips. The puncture fingers 14 make initial contact with the sheet of material and pierce the sheet of material until the dual blades 16A, 16B are in position to contact the sheet of material for cutting. Initial puncture of the sheet of material, prior to cutting, provides for a cleaner and more precise cutting operation. The puncture fingers 14 further shield the dual blades 16A, 16B in a cutting recess 15 region defined by the puncture fingers 14, so as to improve the safety of the cutter 10. The puncture fingers 14 include inner guide surfaces 21 that guide the punctured sheet of material toward the cutting recess 15 region, for further cutting of the punctured sheet of material.

An optional material deflector 26, or multiple material deflectors 26, is provided between the spaced-apart body sections 20A, 20B and blades 16A, 16B. The material deflector 26 operates to pull the sheet of material inserted into the cutting recess 15 region, as guided by the guide surfaces 21 of the puncture fingers 14, against the blade edges 17A, 17B of the dual blades 16A, 16B as the material is being cut. As shown in FIG. 1B, the material deflector 26 is oriented at an angle $\alpha$ relative to the primary axis of the direction of cutting 19. Thus, when a cutting operation is performed in a direction that is along the primary axis 19, the material deflector 26 pulls the sheet of material in a direction a that is oriented toward the blade edges 17A, 17B of the dual blades 16A, 16B, to promote more accurate cutting of the swath of material. The angle $\alpha$ of the deflector and the angle of orientation 3 of the angled guide surfaces 21 of the puncture fingers are positive and negative angles relative to the axis of a direction of cutting.

The cutter 10 of the present invention can be molded from a die, machined from a common stock, or machined or molded as separate parts and assembled. In one embodiment, the handle 12, body 18, fingers 14 and the material deflector 26 of the cutter are unitary. The handle 12, body 18, fingers 14 and the material deflector 26 of the cutter can be formed of plastic, graphite, wood, metal, metal alloy, stainless, or other material suitable for its manufacture and use. In one embodiment for manufacturing a cutter 10 in accordance with the present invention, the cutter 10 is formed in a mold, and the dual blades 16A, 16B are molded directly into the unit, such that the dual blades 16A, 16B are unitary with the handle 12 and puncture fingers 14. The dual blades 16A, 16B are inserted into position in a lower mold. An upper mold is applied to the lower mold and mold material is made to flow into the resulting mold about the dual blades 16A, 16B. The dual blades 16A, 16B optionally include apertures or other features at a base end so that mold material can flow through or about the features to promote secure coupling. Upon curing of the mold material, the lower and upper molds are released and the cutter is complete.

Figure 2A:
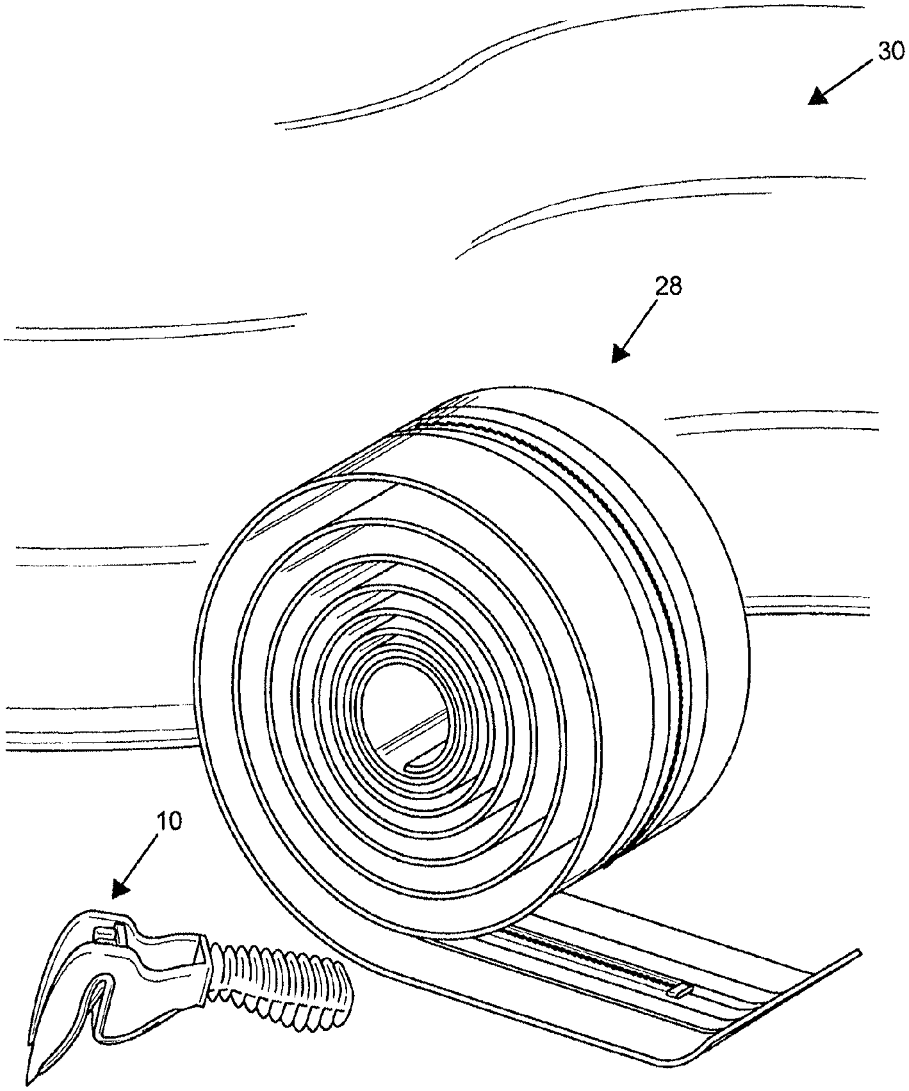
FIGS. 2A-2J are perspective views of a method of installing a zipper to a sheet of material using the cutter of FIGS. 1A, 1B, and 1C in accordance with the present invention.
Figure 2B:
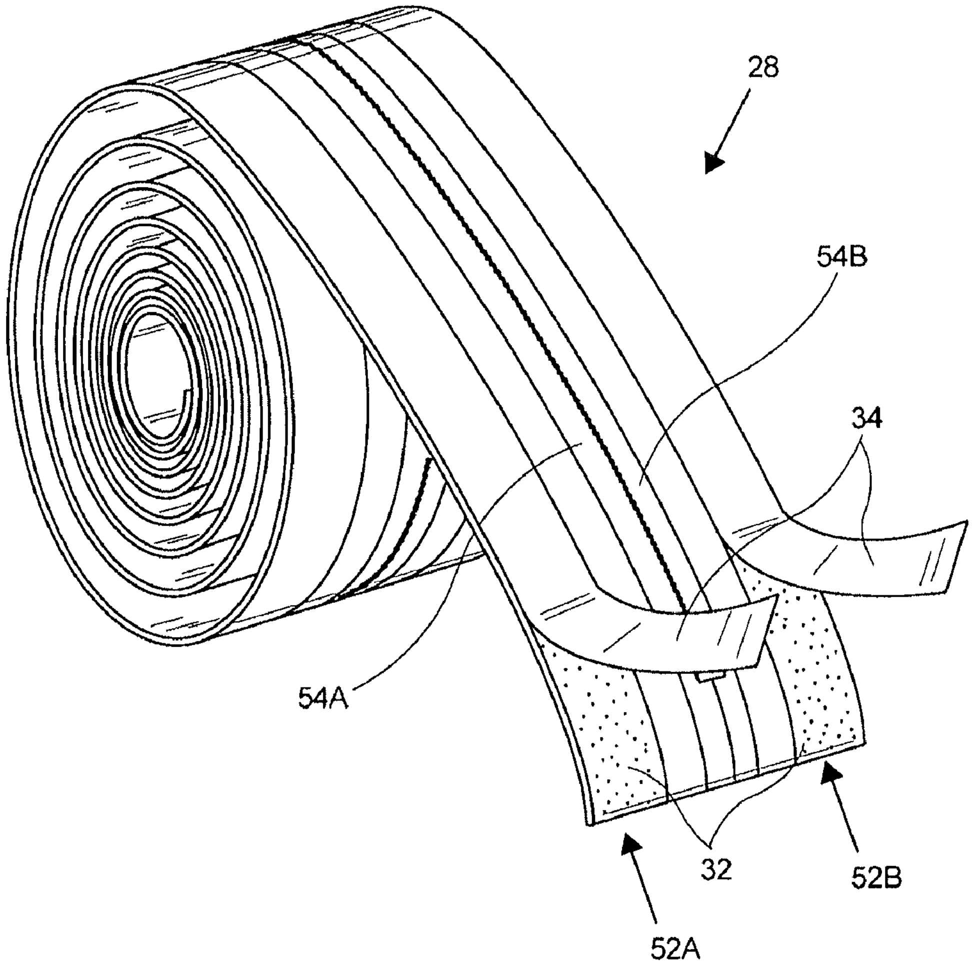
Figure 2C:
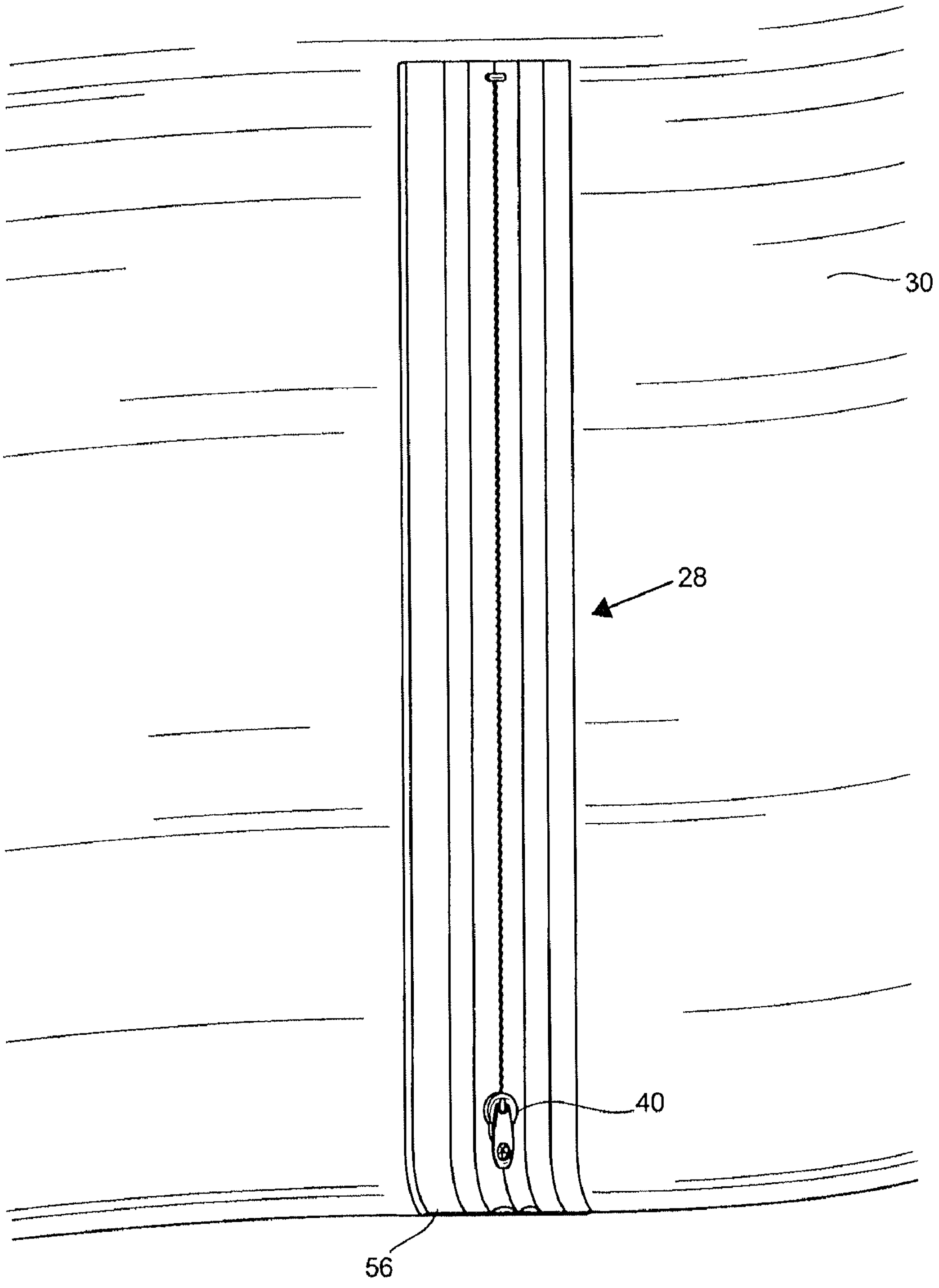
Figure 2D:
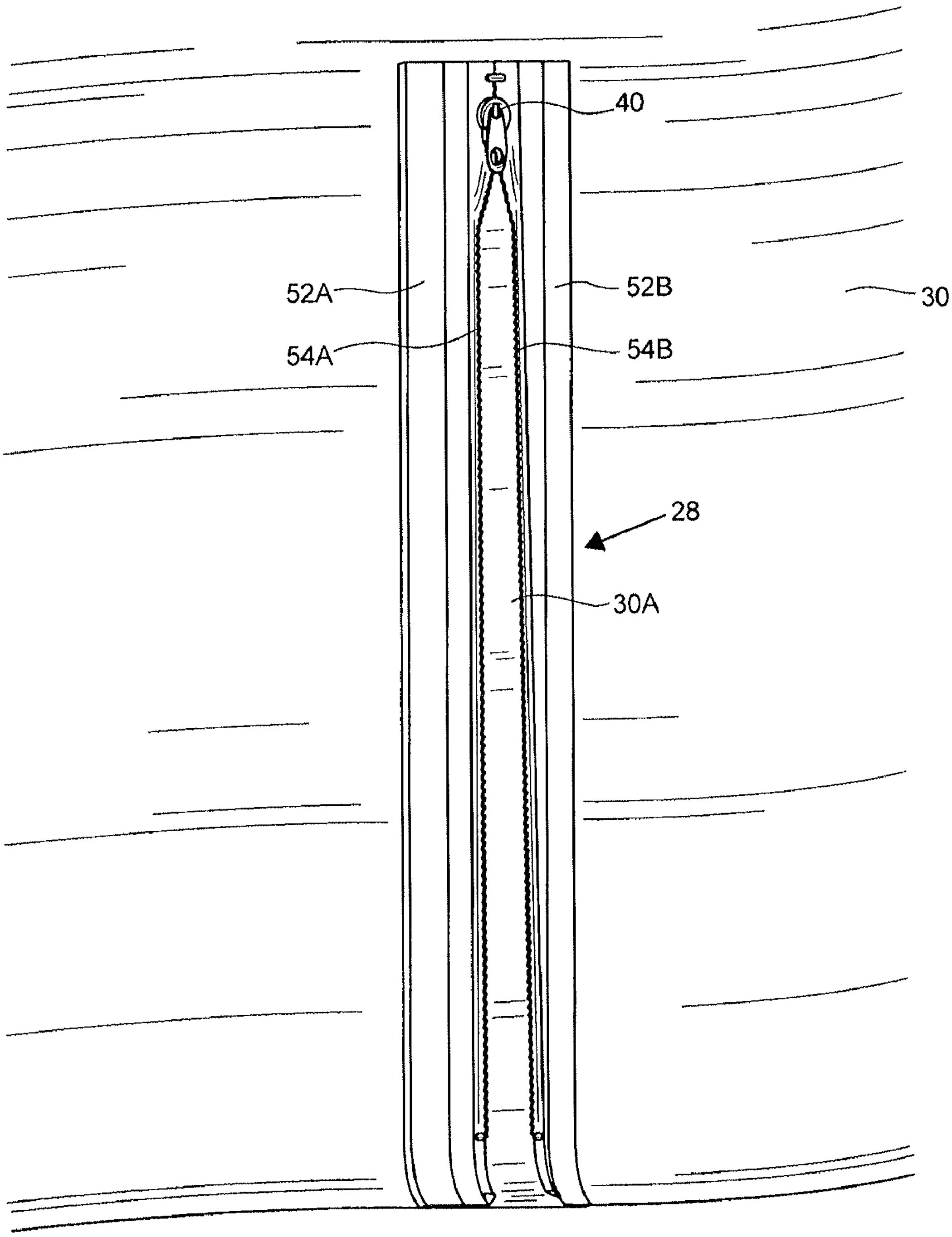

FIGS. 2A-2J are perspective views of a method of installing a zipper to a sheet of material, in this example, a plastic sheet 30, using the cutter 10 of FIGS. 1A, 1B, and 1C in accordance with the present invention. FIG. 2A is a perspective view of the plastic sheet 30, the cutter 10, and a zipper 28 to be installed on the plastic sheet. In FIG. 2B, it can be seen that the zipper 28 includes left and right flanges 52A, 52B to which left and right teeth portions 54A, 54B are attached. A zipper pull 40 (shown in FIG. 2C) interlocks and opens the left and right teeth portions. Each flange 52A, 52B includes an adhesive backing 32 with protective paper strip 34 for protecting the adhesive backing 32 until the time of installation. In FIG. 2C, the protective paper strips 34 are removed and the adhesive backings 32 of the zipper 28 are applied to the installed plastic sheet 30, attaching the zipper to the plastic sheet. In this example, the bottom 56 of the zipper 28 is aligned with the bottom of the plastic sheet 30. In FIG. 2D, the zipper 28 is opened using zipper pull 40 to expose a portion 30A of the plastic sheet 30 beneath the zipper teeth portions 54A, 54B and between the left and right flanges 52A, 52B.

Figure 2E:
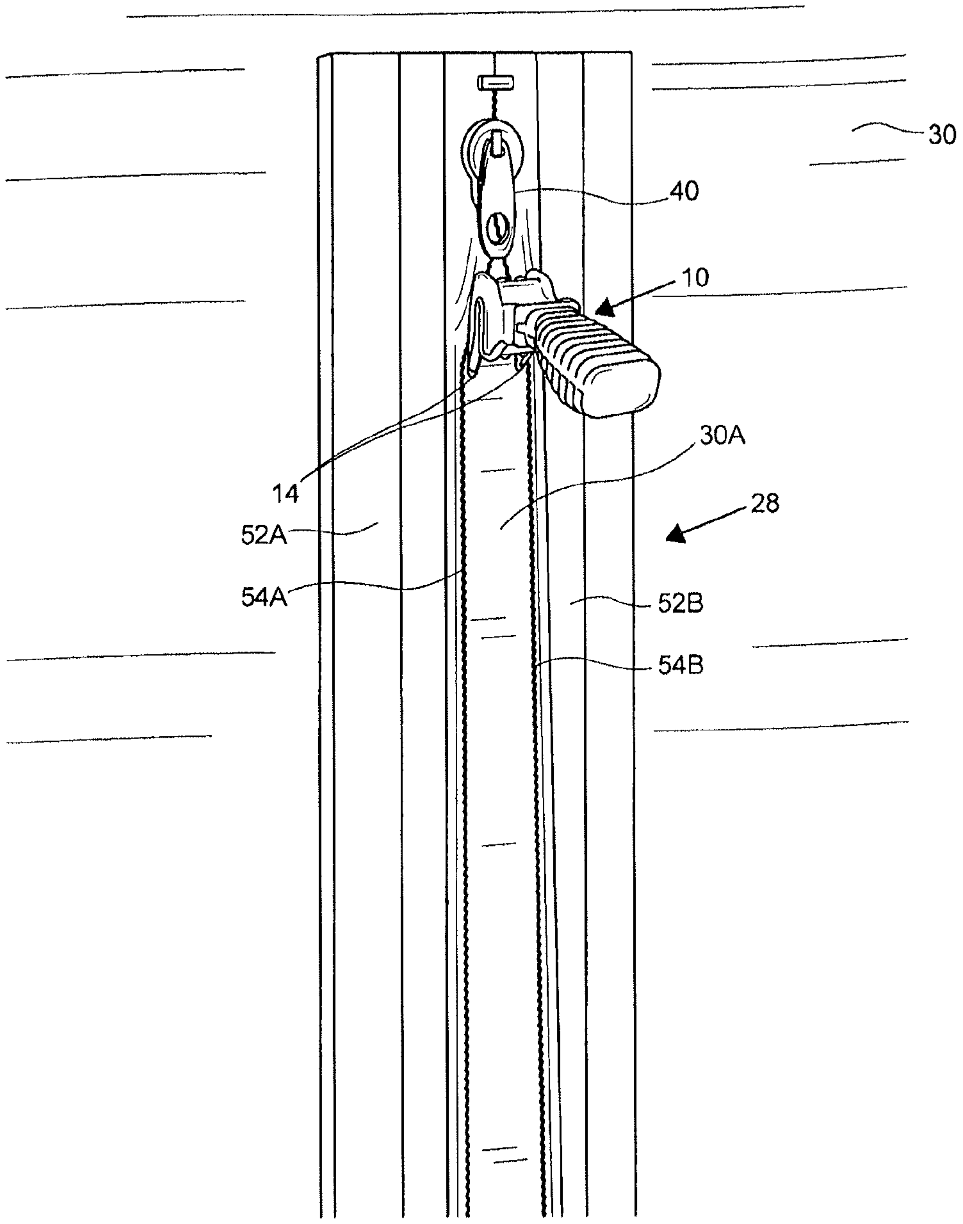

In FIG. 2E, the cutter 10 is positioned at a top portion of the exposed sheet portion 30A between the left and right teeth portions 54A, 54B, and the sharp tips of the puncture fingers 14 are made to initially penetrate the exposed sheet portion 30A, at two spaced-apart piercing locations.

Figure 2F:
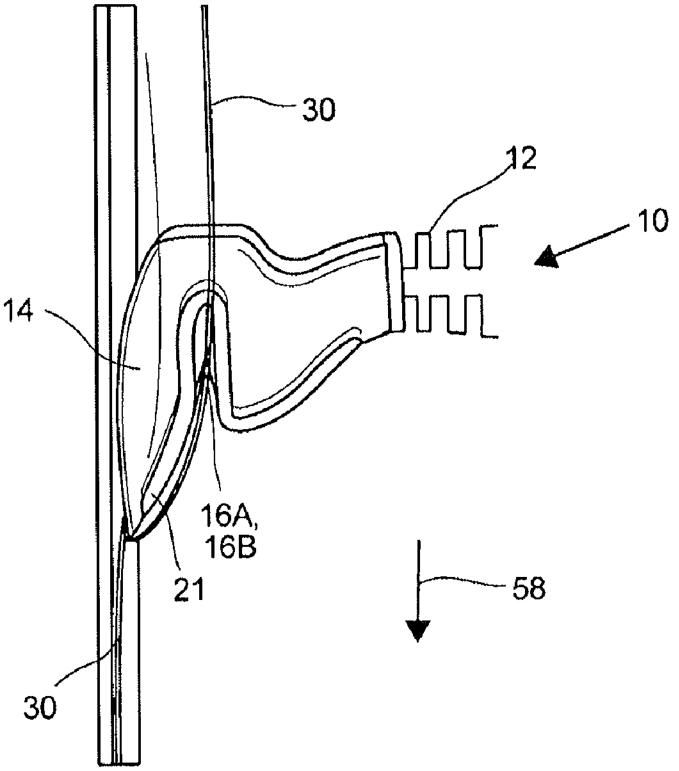

In FIG. 2F, the cutter is pulled in a downward cutting direction, as indicated by arrow 58, which moves the puncture fingers 14 further into the plastic sheet 30. The guide surfaces 21 of the puncture fingers 14 deflect the plastic sheet toward the dual blades 16A, 16B, while, at the same time, the material deflector 26 pulls the plastic sheet 30 taut against the dual blades 16A, 16B.

Figure 2G:
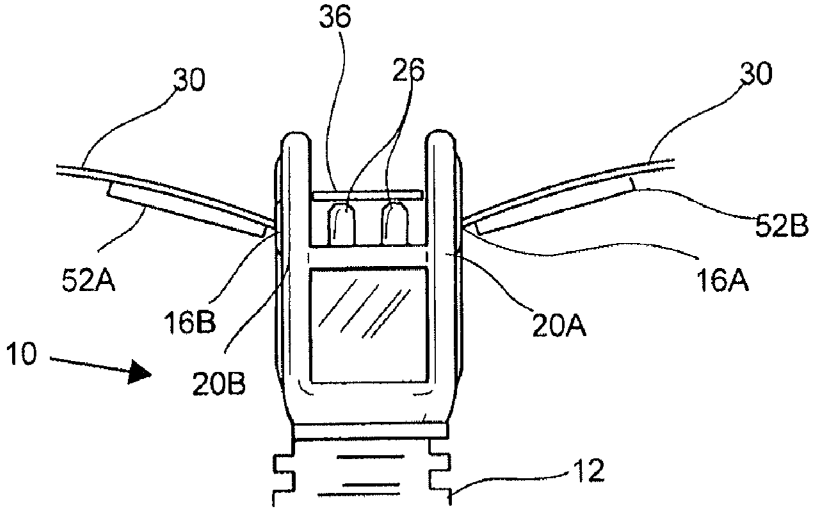

Referring to FIG. 2G as cutting continues in the downward direction 58, two parallel cuts are made in the plastic sheet by blades 16A, 16B. The two parallel cuts define a swath of material 36 that is cut between the left and right flanges 52A, 52B of the zipper. The blades 16A, 16B are spaced apart by a suitable distance $d_1$ such that the cuts are made close to the flanges 52A, 52B, so that excess plastic sheet material is not present between the left and right zipper teeth 54A, 54B. In this manner, any plastic sheet material that remains between the left and right portions of the zipper will not interfere with proper zipper operation.

Figure 2H:
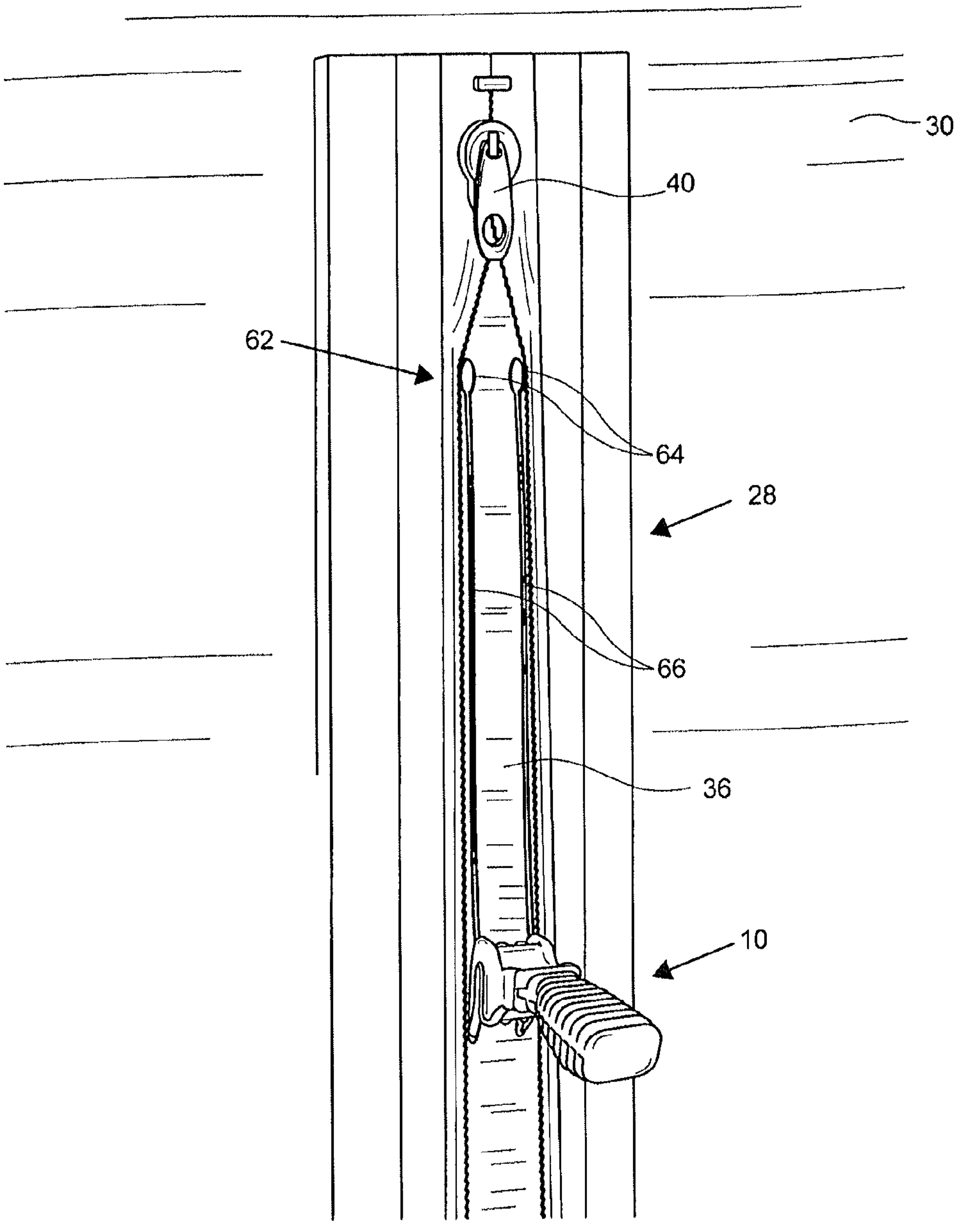
Figure 2I:
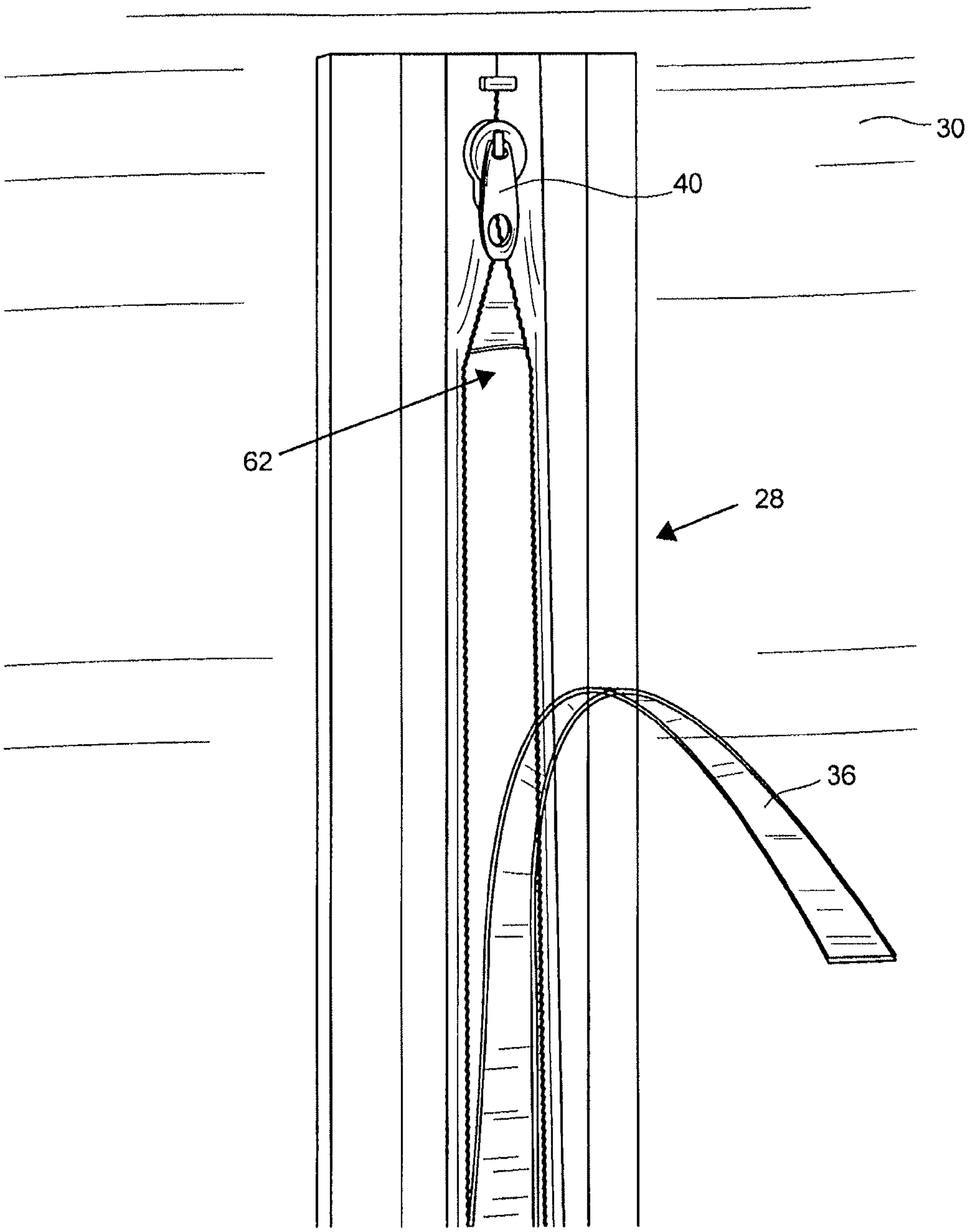

In FIG. 2H, the swath of material 36 cut between the left and right zipper portions can be seen. The swath of material 36 remains attached at the puncture region 62 where the cut was initiated at puncture holes 64. The dual parallel cuts 66 extend from the puncture holes 64 along the length of the zipper 28. Following completion of the cut, the swath of material can be torn or cut in the puncture region 62 at the top, bottom, or top and bottom portions of the zipper 28, and removed as shown in FIG. 2I.

Figure 2J:
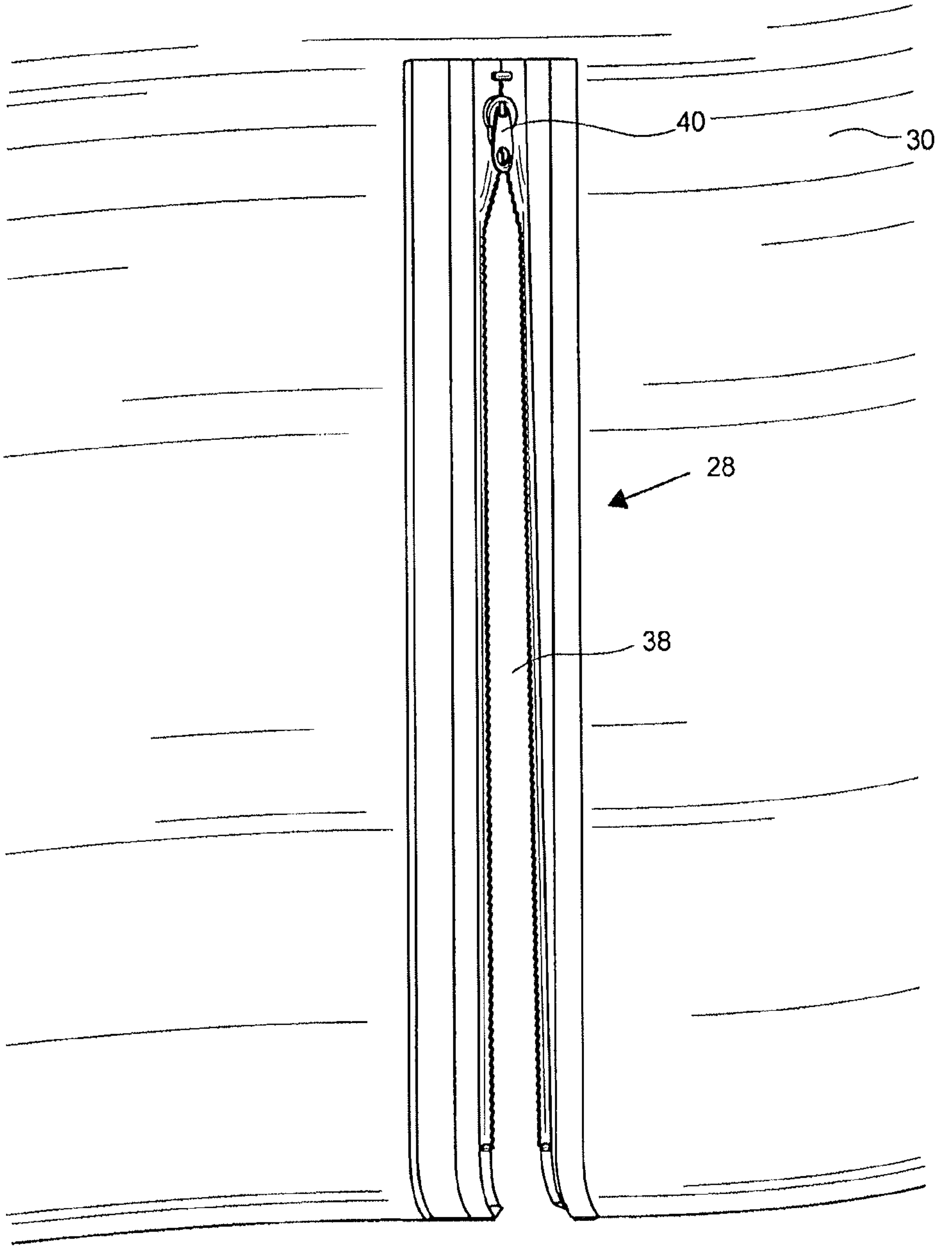

FIG. 2J is a perspective view of the opened zipper 28 after the swath of material 36 between the parallel cuts is removed. An entryway 38 is provided in the opening of the zipper 28. The entryway 38 can be opened and closed at will by engaging and releasing the zipper with the zipper pull 40. By using this method of installing a zipper, a uniform cut is made, and the presence of a flap of excess material in the opening of the zipper 28 that otherwise would interfere with proper zipper operation is avoided.

While this invention has been particularly shown and described with references to preferred embodiments thereof, it will be understood by those skilled in the art that various changes in form and details may be made herein without departing from the spirit and scope of the invention.

For example, in another embodiment, the dual blades 16A, 16B can be configured to extend the length of the puncture fingers 14, and thereby operate to both puncture, and slice, the plastic sheet 30. In another embodiment, a width-adjustment mechanism can be included to adjust the distance between the blades. This would allow the swath of material between the zipper flanges to be cut to an adjustable width.

I claim:

1. A method of installing a zipper on a sheet of material, comprising:

applying left and right portions of a zipper to a sheet of material; and piercing and cutting the sheet of material using a cutter, the cutter comprising:

a handle;

two spaced-apart blades;

two piercing fingers corresponding to the two spaced-apart blades, the two piercing fingers including angled guide surfaces, the two piercing fingers being oriented to define a cutting region between the first and second piercing fingers and the handle, wherein the two spaced-apart blades are recessed in the cutting region; and a deflector that is oriented at a second angle that is opposite a first angle of the angled guide surfaces of the first and second piercing fingers relative to an axis of direction of cutting;

wherein piercing comprises piercing the sheet of material with the piercing fingers; and wherein cutting comprises, following piercing, cutting a swath portion of the sheet of material having two parallel, spaced-apart cuts between the left and right portions of the zipper by applying a cutting force that guides the pierced sheet of material toward the two spaced-apart blades between the angled guide surfaces and the deflector.

2. The method of claim 1, wherein applying left and right portions of a zipper to a sheet of material comprises adhering back portions of the left and right portions to a common surface of the sheet of material.

3. The method of claim 2, wherein a central region of the zipper between the left and right portions is not adhered to the sheet of material, and wherein the swath portion of the sheet of material that is cut corresponds to the central region of the zipper.

4. The method of claim 1 further comprising, prior to cutting the swath portion, opening the zipper to expose a portion of the sheet of material between the left and right portions.

5. The method of claim 4, wherein cutting comprises cutting through the opened zipper.

6. The method of claim 1, wherein the sheet of material is a plastic sheet.

7. The method of claim 1, further comprising cutting the two parallel, spaced-apart cuts to a predetermined distance between approximately 0.5 cm and 3.0 cm.

* * * * *